United States Patent
Rusitschka et al.

(10) Patent No.: US 7,936,768 B2
(45) Date of Patent: May 3, 2011

(54) METHOD FOR OPERATING A DECENTRALIZED DATA NETWORK

(75) Inventors: Steffen Rusitschka, München (DE); Alan Southall, München (DE); Sebnem Öztunali, München (DE)

(73) Assignee: Siemens Aktiengesellschaft, Munich (DE)

( * ) Notice: Subject to any disclaimer, the term of this patent is extended or adjusted under 35 U.S.C. 154(b) by 211 days.

(21) Appl. No.: 12/281,859

(22) PCT Filed: Jan. 9, 2007

(86) PCT No.: PCT/EP2007/050181
§ 371 (c)(1),
(2), (4) Date: Sep. 5, 2008

(87) PCT Pub. No.: WO2007/104586
PCT Pub. Date: Sep. 20, 2007

(65) Prior Publication Data
US 2009/0028165 A1  Jan. 29, 2009

(30) Foreign Application Priority Data
Mar. 10, 2006 (DE) .................. 10 2006 011 291

(51) Int. Cl.
*H04L 12/56* (2006.01)
(52) U.S. Cl. ......... 370/400; 370/230; 370/237; 370/406
(58) Field of Classification Search ........................ None
See application file for complete search history.

(56) References Cited

U.S. PATENT DOCUMENTS

| | | | | |
|---|---|---|---|---|
| 7,657,597 | B2 * | 2/2010 | Arora et al. | 709/206 |
| 7,685,312 | B1 * | 3/2010 | Caronni et al. | 709/245 |
| 2004/0064512 | A1 * | 4/2004 | Arora et al. | 709/206 |
| 2004/0064693 | A1 * | 4/2004 | Pabla et al. | 713/168 |
| 2005/0050028 | A1 * | 3/2005 | Rose et al. | 707/3 |
| 2005/0203901 | A1 * | 9/2005 | Waldvogel et al. | 707/5 |
| 2007/0143442 | A1 * | 6/2007 | Zhang et al. | 709/217 |
| 2009/0100069 | A1 * | 4/2009 | Bosley et al. | 707/10 |

OTHER PUBLICATIONS

Marvin Theimer and Michael B. Jones, "Overlook: Scalable Name Service on an Overlay Network," Proceedings of the 22nd International Conference on Distributed Computing Systems, Vienna, Austria, IEEE Computer Society, Jul. 2002, pp. 1-4.*

* cited by examiner

*Primary Examiner* — Jayanti K Patel
*Assistant Examiner* — Anthony Sol
(74) *Attorney, Agent, or Firm* — Laurence A. Greenberg; Werner H. Stemer; Ralph E. Locher

(57) ABSTRACT

A decentralized data network contains a plurality of network nodes. The network nodes are able to direct requests into the data network with the aid of checking values. The network nodes are each assigned one or more table entries in a value table distributed between the network nodes, with each table entry containing a checking value and the data associated with the checking value. Each of the plurality of network nodes are monitored to determine the frequency with which requests for the checking values assigned to a respective network node are directed to the respective network nodes. If it is found that the frequency of the requests for one or more checking values to a respective network node exceeds a predetermined threshold value, at least the table entry or entries for this or these checking values is or are assigned to at least one other network node.

20 Claims, 3 Drawing Sheets

METHOD FOR OPERATING A DECENTRALIZED DATA NETWORK

BACKGROUND OF THE INVENTION

Field of the Invention

The invention relates to a method for operating a decentralized data network comprising a plurality of network nodes, with the network nodes being able to direct requests into the data network with the aid of checking values.

In decentralized networks, for example in peer-to-peer overlay networks based on a distributed hash table, resources are distributed in a decentralized manner to the individual network nodes. In such networks it is possible for each individual network node to search for appropriate resources with the aid of keywords. To this end keywords are used which create a unique checking value from a keyword. The checking values are administered by the network nodes, with each network node being responsible for predetermined checking values. The checking values are used by the network nodes to direct search requests into the network for example. Furthermore a network node can also send so-called disclosure requests for a specific checking value to the network node which is responsible for the specific checking value. The sending network node uses such disclosure requests to notify that it would like to disclose in the network resources which are assigned to the specific request and hereby to the corresponding keyword, i.e. it would like to make them available to the other network nodes. In addition the network nodes can direct so-called subscription requests into the network with which a network node informs another network node responsible for a specific request value that it would like to be informed about the disclosure of content relating to this specific request value.

The checking values are for example hash values which are generated with a hash algorithm. Preferably the checking values are stored in a table, with each table entry containing a corresponding checking value as well as the data assigned to this checking value, for example a reference to a memory location of corresponding resources. This data is held in such cases in conjunction with the keyword from which the checking value was generated. The table is preferably distributed decentrally in the data network, with each network node being responsible for range of values of the table.

The situation can now arise in which specific resources, meaning specific checking values, are requested particularly often by corresponding requests in the network, especially searched for, disclosed and subscribed to. The result is then an overloading of those network nodes which are responsible for the corresponding checking values. Such network nodes are also referred to as a "hot spots". When a hot spot is overloaded the result can be blocking and failure of this network node. The result is that the network traffic in the area of this hot spot grows so that the stability of the entire network is endangered. The performance of the network is also reduced.

To resolve the hot spot problem the practice of replicating especially popular data on one or more network nodes is known from the prior art. For example the popular data for which a corresponding network node is responsible can be replicated directly on neighboring nodes. However it is also possible to replicate the data on any other given node, for example nodes determined by algorithms. The replication of data however brings with it the problem that it must always be ensured in the network that the replicated copies are up-to-date. This demands further special mechanisms. There is no method known from the prior art with which the problem of hot spots can be resolved in a satisfactory manner.

BRIEF SUMMARY OF THE INVENTION

The object of the invention is therefore to create a method for operating a decentralized data network in which the overloading of a network node as a result of too many requests can be simply and effectively avoided.

This object is achieved by the independent claims. Developments of the invention are defined in the dependent claims.

In the inventive method a number of network nodes are each allocated one or more table entries of a table of values distributed between the network nodes, with each table entry comprising a checking value and data assigned to the checking value. The table of values in this case is preferably the above-mentioned distributed hash table, with the checking values representing hash values in the hash table. Preferably it is ensured that one or more keywords are uniquely assigned to a checking value, which can be achieved when using a distributed hash table with one hash algorithm, for example SHA1.

In the inventive method the frequency with which the requests for the checking values assigned to a respective network node are directed into the respective network node can be monitored. Requests in this case are taken especially to mean the search and/or disclosure and/or subscription requests mentioned at the outset. The inventive method is characterized by the fact that in the case in which the frequency of the requests for one all more checking values exceeds a predetermined threshold value at a respective network node, at least the table entry or table entries of this checking value or these checking values are assigned to at least one other network node.

Such monitoring and allocation of a frequently-requested checking value to another network node enables an overloading of a network node to be avoided in an effective manner. The threshold value can in this case be selected in accordance with the requirements and the size of the data network, for example the threshold value can be determined heuristically.

In a preferred form of embodiment of the invention the data assigned to a checking value is resources, especially files, or references to memory locations of resources in the data network.

In a preferred embodiment of the inventive method the other network node to which at least the table entry or table entries is or are allocated is embodied such that it can process requests for which the frequency lies above a specific threshold value. This ensures that an overloading of the data network does not arise again since the other network node has capabilities which guarantee that it can process the popular requests. The other network node in this case can be a single powerful network computer or a cluster of network computers.

In a further preferred embodiment of the invention, if the threshold value of the frequency of the requests is exceeded for one or more checking values in a respective network node, a new network node is inserted into the data network, with this new network node at least being able to be allocated the table entry or table entries of this or these checking values. Alternatively it is also possible that when the threshold value of the frequency of requests for one or more checking values is exceeded in a respective network node, for at least the table entry or the table entries of this or these checking values to be allocated to a network node already present in the data network.

In a further embodiment of the inventive method, if the threshold value of the frequency of the requests for one or more checking values is exceeded in a network node, the respective network node is replaced by the other network node. This guarantees an especially simple mechanism for avoiding overloads, with especially no redistribution of the table entries of the table of values to other network nodes having to be undertaken.

In a further embodiment of the inventive method an allocation of the table entry or the table entries to a mother network node is cancelled when the frequency of the requests drops below the predefined threshold value once more. This guarantees that in normal operation the original network structure is established once again.

In an especially preferred embodiment the network node administers a contiguous range of values of table entries in each case. In this case the checking value for which the threshold value of the frequency of requests in the respective network node would be exceeded is removed from the range of values of the respective network node and allocated to the other network node. In this case the values of the range of values of the respective overloaded network node are allocated from the start of the range of values up to the removed checking value—excluding this checking value—to the network node which has the range of values which is adjacent to the start of the range of values of the overloaded network node. Furthermore the values of the range of values of the respective network node are allocated to the overloaded network node as a new range of values from the removed checking value—and excluding this checking value—up to the end of the range of values of the overloaded network node. This method is based on the join mechanism known for networks with distributed hash tables and guarantees a simple and effective incorporation of a new network node by dividing up the hash ranges to adjacent network nodes.

Instead of using this join mechanism, if the frequency of the requests for one or more checking values is exceeded in a respective network node, the range of values of the respective network node can also be completely allocated to the other network node.

In a further embodiment of the inventive method the steps of monitoring the requests and/or the allocation of table entries to other network nodes can be performed decentrally by each network node for the requests directed to it. If necessary the data network can be administered by a network operator, with the individual network nodes notifying overloads to the network operator who then undertakes the allocation of table entries to a mother network computer, especially the incorporation of a new network computer.

As well as the method described above, the invention further relates to a decentralized data network comprising a plurality of network nodes, with the data network being embodied such that a method as claimed in one of the previous claims is able to be executed. The data network in this case is a computer network for example in which the network nodes comprise one or more computers, especially a peer-to-peer network, e.g. in the form of a chord ring.

Exemplary embodiments of the invention will be described in detail below with reference to the enclosed figures.

The figures show:

DESCRIPTION OF THE INVENTION

In the embodiment described below a decentralized data network in the form of a peer-to-peer overlay network is taken as a typical example which is operated in accordance with the inventive method. The network has a ring structure, typically in the form of a chord ring and comprises peers A, B, C, D, E, F, G, H and I, which represent network nodes which in their turn represent one or more network computers. In the network shown in FIG. 1 it is possible to search for resources in the network. The distributed hash table sufficiently known from the prior art is used for this purpose. The search is made possible with the aid of keywords, with a unique hash value being created by a hash algorithm, for example SHA1, for each keyword. An assignment to corresponding data then exists for the corresponding hash value in the form of a table entry, with said data relating to the keyword to which the hash value is allocated. The data in this case can be resources which are connected to keywords, for example MP3 files, digital images, Web pages and suchlike. Thus a hash table exists which comprises a plurality of hash values, with each hash value being assigned corresponding data. This table is distributed in the network depicted in FIG. 1 between the network nodes A to I involved with each network node being responsible for a range of values of the table. In accordance with FIG. 1 the responsibilities are distributed as follows:

Peer A administers the hash values 10000000 to 10000009;
Peer B administers the hash values 10000010 to 10000019;
Peer C administers the hash values 10000020 to 10000029;
Peer D administers the hash values 10000030 to 10000039;
Peer E administers the hash values 10000040 to 10000049;
Peer F administers the hash values 10000050 to 10000059;
Peer G administers the hash values 10000060 to 10000069;
Peer H administers the hash values 10000070 to 10000079;
Peer I administers the hash values 10000080 to 10000089.

Each peer can now direct requests into the data network with the keywords, with the keywords being converted for this purpose into the corresponding hash values. The mechanism of finding hash values in a hash table distributed between peers is a mechanism sufficiently known from the prior art, and it is therefore not described in any greater detail here.

Figure 1:
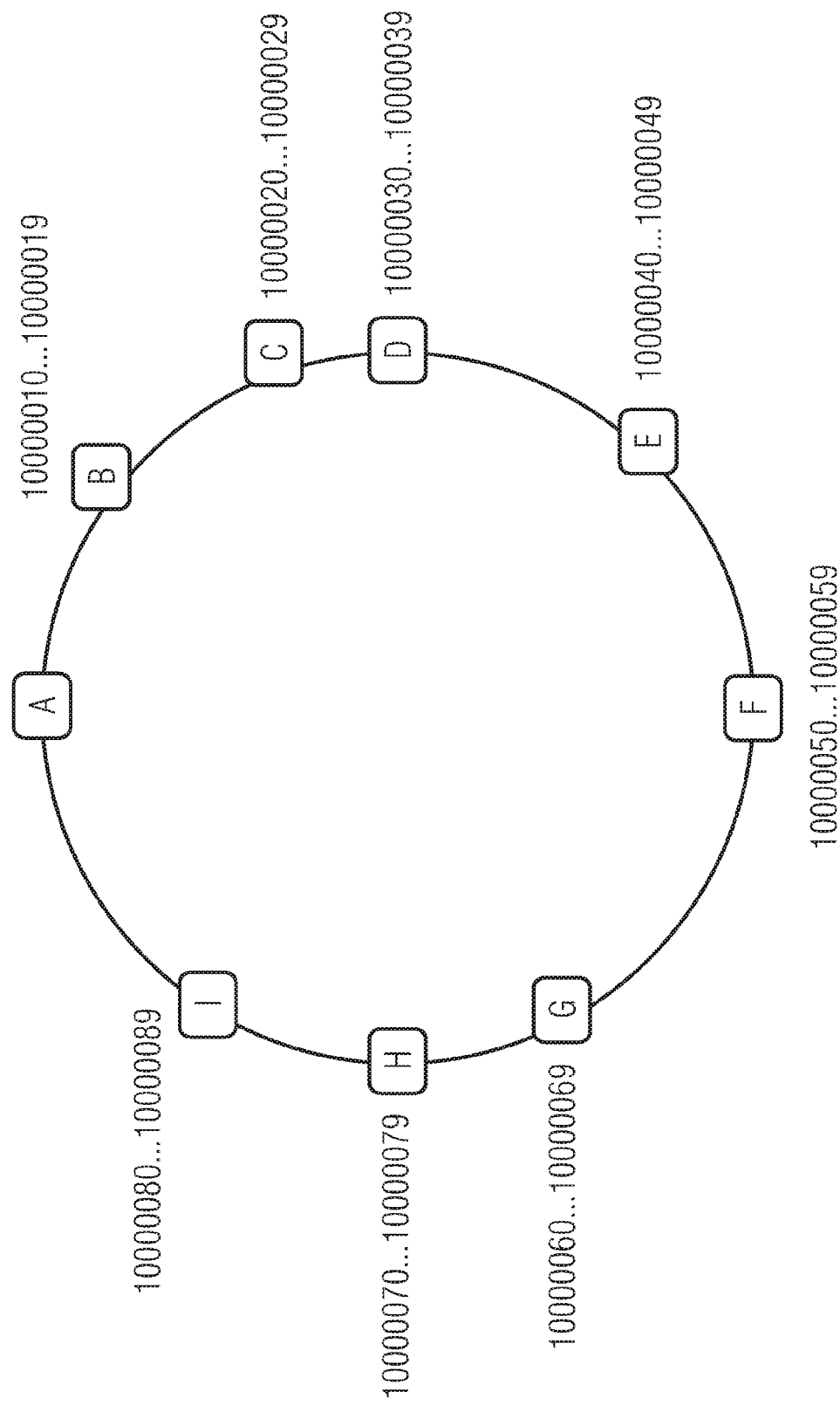
FIG. 1 a schematic diagram of a peer-two-peer network based on a distributed hash table in which the inventive method is able to be used.
Figure 2:
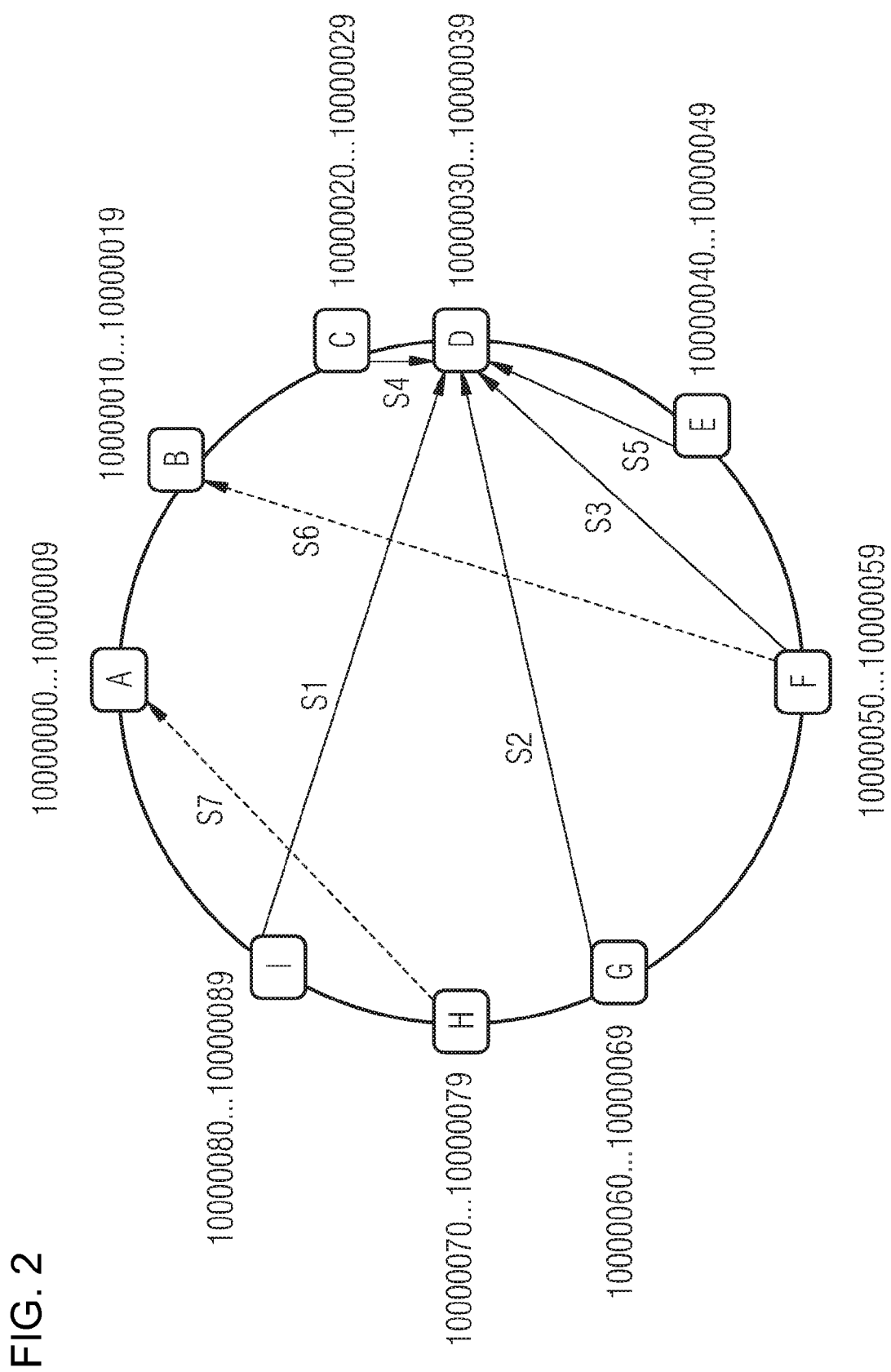
FIG. 2 a schematic diagram similar to that depicted in FIG. 1, in which the scenario of the overload of a peer is shown.

FIG. 2 shows an example of the method of sending requests into the data network depicted in FIG. 1. In the network requests S1 to S7 are directed from various peers to other peers, as is indicated by the corresponding solid or dashed arrows. The requests S1 to S5 are directed in this case from the corresponding peers I, G, F, C and E to the peer D. These requests are shown by solid lines. The requests in this case are for example search requests which are searching for a file xyz requested an above-average number of times in the network, with the corresponding hash value for these search requests being stored in peer D. The hash value which is requested especially often in peer D has a value of 10000033 for example, which lies within the range of values administered by peer D. By contrast requests S6 and S7 of peers F or H relate to other data stored in the network which is less popular.

Should the frequent requests to the hot-spot peer D exceed a predetermined level, the result can be a failure of this peer, which in its turn can bring with it a collapse of the entire network. To avoid these types of hot spots, in accordance with the inventive method monitoring is undertaken in each peer as to how frequently requests are directed to the peer concerned. This can be undertaken decentrally by each peer itself, but it is however also possible for a central monitoring body to be provided which monitors requests in all peers. In the embodiment described here the frequency of the requests is recorded by the peer itself, with each peer issuing a corresponding message to a network operator who is responsible for the decentralized network if a threshold is exceeded. The network operator in this case administers a plurality of very powerful computers or computer clusters which if necessary can be linked into the decentralized data network.

Figure 3:
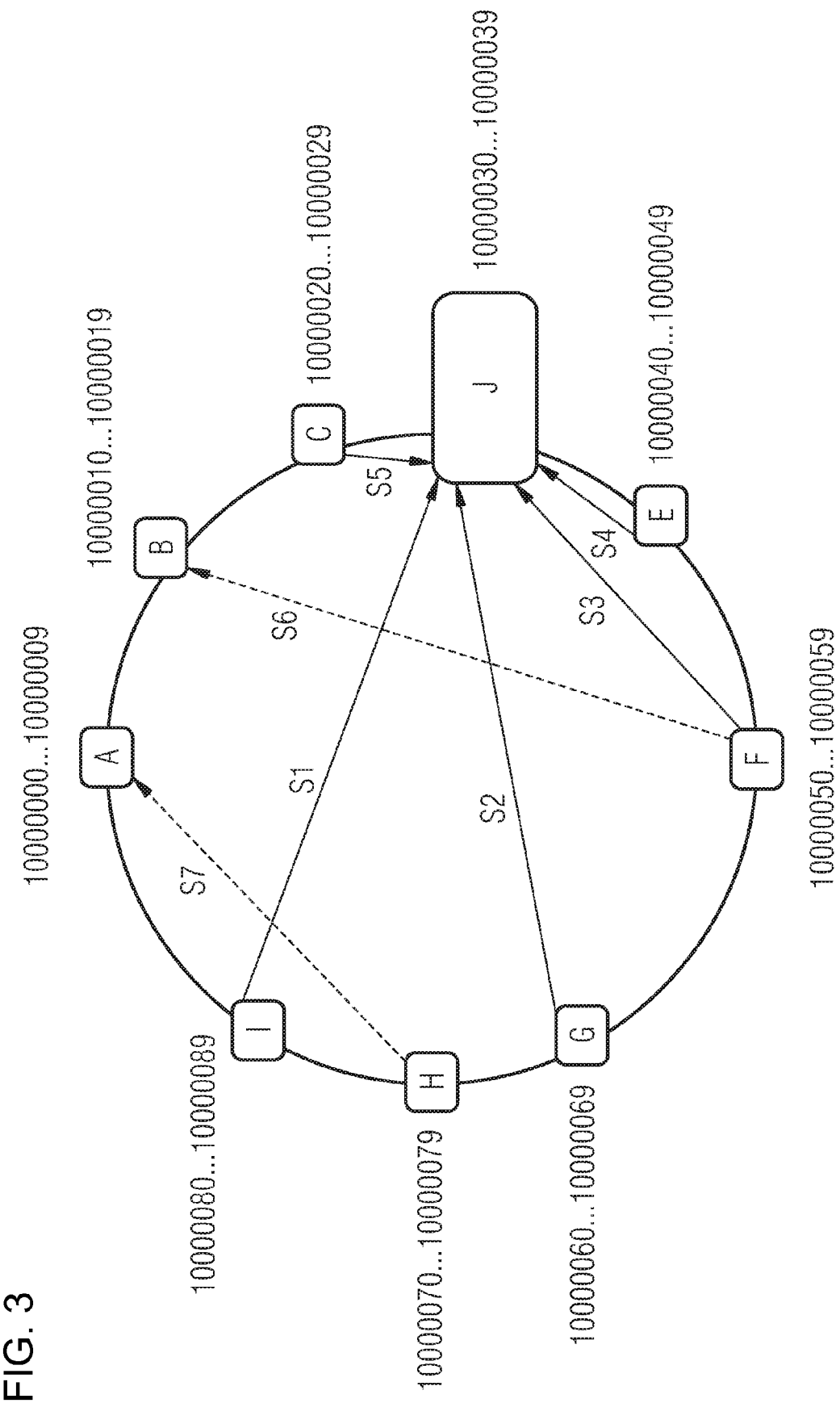
FIG. 3 a view similar to that depicted in FIG. 1 and FIG. 2 which illustrates the replacement of the overloaded peer as claimed in an embodiment of the inventive method.

In the scenario of FIG. 2 an overload resulting from too frequent requests is notified to the network operator by peer D. As a consequence the operator now takes peer D out of the network and replaces it by a high-power computer or a cluster of high-power computers. This process is shown in FIG. 3. Peer D is now no longer present, but instead a high-power computer J is used, with the computer being designed so that it can fulfill the capacity demands of the high level of requests. Computer J thus represents the replacement for peer D and it takes over the administration of the hash values 10000030 to 10000039 previously administered by peer D. Should it be established after a specific period that the number of requests in computer J has dropped again, this is notified to the network operator who can then again link the original peer D back into the data network.

Instead of the replacement of peer D by peer J just described, it is also possible if necessary only to allocate the heavily requested hash-value, which in the embodiment described here is 10000033 for example, to another peer, with this peer able to be a peer already present in the network or a new peer incorporated by an operator. For example it is possible to incorporate the powerful computer J into the network such that it is only responsible for the hash value 10000033, the result of which is that the load on peer D is greatly reduced, since all requests S1 to S5 now go to peer J. In this case a rearrangement of the ranges of values of the distributed hash table is necessary. In particular the hash values 10000034 to 10000039 are then only assigned to peer D, and peer C, which administers the adjacent smaller hash values 10000020 to 10000029 now takes over the range of values of 10000030 to 10000032, meaning that it now administers the hash values 10000020 to 10000032. The mechanism of reallocation of the hash values just described is the join mechanism known from the prior art for arranging a new peer in a peer-to-peer system based on a distributed hash table.

The embodiment of the inventive method just described has been described with reference to an example in which the network is administered by an operator who incorporates the peer J into the network. This is however not absolutely necessary. It is also possible for another peer which is less heavily loaded or has a high performance already present in the network to take over all the tasks of peer J, so that no additional peer has to be included in the network.

The invention claimed is:

1. A method for operating a decentralized data network containing a plurality of network nodes, the network nodes being able to direct requests with an aid of checking values into the decentralized data network, which comprises the steps of:
   a) allocating to the network nodes in each case at least one table entry from a table of values distributed to the network nodes, each said table entry containing a checking value and data assigned to the checking value, and the network nodes each administering a contiguous range of values of the table entries;
   b) monitoring each of the network nodes for determining a frequency with which requests for checking values allocated to a respective network node are directed to the respective network node;
   c) if the frequency of the requests for at least one of the checking values to the respective network node exceeds a predetermined threshold value, allocating at least the one table entry of the checking value to one other network node; and
   d) removing the checking value for which the predetermined threshold value of the frequency of the requests in the respective network node was exceeded from a range of values of the respective network node and allocating it to the other network node, with the table entry of the range of values of the respective network node being allocated from a beginning of the range of values up to a removed checking value and excluding the checking value to the network node which has a range of values which lies adjacent to a start of the range of values of the respective network node lies, and with the table entries of the range of values of the respective network node being allocated from the removed checking value and excluding the checking value up to an end of the range of values of the respective network node to the respective network node as a new range of values.

2. The method according to claim 1, which further comprises forming the table of values as a distributed hash table, with the checking values representing hash values in a hash table.

3. The method according to claim 1, which further comprises uniquely assigning at least one keyword to each of the checking values.

4. The method according to claim 3, which further comprises generating each unique assignment of the keyword to the checking value using a hash algorithm.

5. The method according to claim 1, wherein the data assigned to a checking value are resources.

6. The method according to claim 1, which further comprises embodying the other network node to process the requests of which the frequency lies above the predetermined threshold value.

7. The method according to claim 1, which further comprises selecting the other network node from the group consisting of a network computer and a cluster of network computers.

8. The method according to claim 1, wherein if in the step c) the predetermined threshold value of the frequency of the requests for at least one of the checking values in a respective network node is exceeded, assigning a new network node to the decentralized data network to which at least the table entry of the checking value is allocated.

9. The method according to claim 1, wherein if the predetermined threshold value of the frequency of the requests for at least one of the checking values is exceeded in the respective network node, allocating the table entry of the checking value to a network node already present in the decentralized data network.

10. The method according to claim 1, wherein if the predetermined threshold value of the frequency of the requests for at least one of the checking values is exceeded in the respective network node, replacing the respective network node with the other network node.

11. The method according to claim 1, which further comprises cancelling an allocation of the table entry to the other network node in step c) if the frequency of the requests again lies below the predetermined threshold value.

12. The method according to claim 1, wherein if the predetermined threshold value of the frequency of the requests for at least one of the checking values in the respective network node is exceeded, assigning a range of values of the respective network node to the other network node.

13. The method according to claim 1, which further comprises executing at least one of step b) and step c) in a decentralized fashion by each network node for the requests directed to it.

14. The method according to claim 1, which further comprises administering the data network by a network operator.

15. The method according to claim 1, which further comprises using a SHA1 algorithm as the hash algorithm.

16. The method according to claim 1, wherein the data assigned to a checking value is one of files and references to storage locations of resources in the data network.

17. A decentralized data network, comprising:
a plurality of network nodes; and
the decentralized data network programmed to:
 a) allocate to said network nodes in each case at least one table entry from a table of values distributed to said network nodes, each said table entry containing a checking value and data assigned to the checking value, and the network nodes each administering a contiguous range of values of the table entries;
 b) monitor each of said network nodes for determining a frequency with which requests for the checking values allocated to a respective network node are directed to said respective network node;
 c) if the frequency of the requests for at least one of the checking values to said respective network node exceeds a predetermined threshold value, allocate at least the table entry of the checking value to one other of said network nodes; and
 d) removing the checking value for which the predetermined threshold value of the frequency of the requests in the respective network node was exceeded from a range of values of the respective network node and allocating it to the other network node, with the table entry of the range of values of the respective network node being allocated from a beginning of the range of values up to a removed checking value and excluding the checking value to the network node which has a range of values which lies adjacent to a start of the range of values of the respective network node lies, and with the table entries of the range of values of the respective network node being allocated from the removed checking value and excluding the checking value up to an end of the range of values of the respective network node to the respective network node as a new range of values.

18. The data network according to claim 17, wherein the data network is a computer network and said network nodes each have at least one computer.

19. The data network according to claim 17, wherein the data network is a peer-to-peer network.

20. The data network according to claim 19, wherein said peer-to-peer network is a chord ring.

* * * * *